Figure 1:
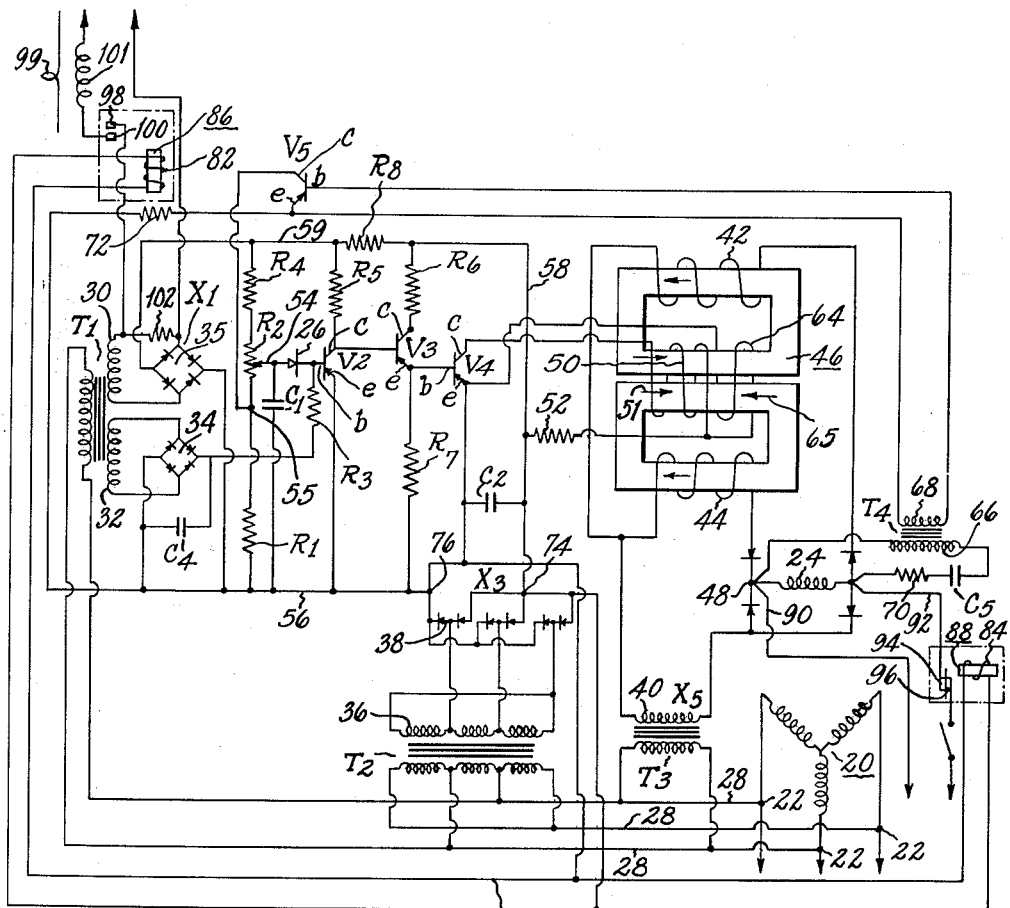

Jan. 10, 1961 W. J. RADY ET AL 2,967,990
CONTROL CIRCUIT
Filed May 23, 1956 3 Sheets-Sheet 1

A.C. LOAD

INVENTORS
WILLIAM J. RADY
BY CHARLES W. KING

ATTORNEY

INVENTORS
WILLIAM J. RADY
BY CHARLES W. KING
ATTORNEY

# United States Patent Office 2,967,990
Patented Jan. 10, 1961

2,967,990

CONTROL CIRCUIT

William J. Rady and Charles W. King, Anderson, Ind., assignors to General Motors Corporation, Detroit, Mich., a corporation of Delaware Filed May 23, 1956, Ser. No. 586,787

18 Claims. (Cl. 322—28)

The present invention relates to circuit networks and more particularly to a voltage regulator which includes a transistor circuit network which will maintain a source of electrical energy at a constant voltage.

The static transistor-reactor regulator, according to the present invention, may be used to maintain the output of an alternator or a transformer, at a constant voltage. When the regulator is thus used, it will maintain the output voltages substantially constant within limits heretofore unknown while the units are operated from no to full load.

The regulator circuit network which will be hereinafter described comprises, transistors, rectifiers, transformers, resistors, silicon diodes and saturable reactors which are arranged in a manner to control a source of electrical power within very narrow limits. This is accomplished by controlling a saturable reactor, which is sometimes known as magnetic amplifier or transductor, by a circuit network which includes transistors and a silicon diode.

As will be seen from the description which follows, the regulator, according to the present invention, is formed without moving parts. This means the regulator will have practically an indefinite life, will be more sensitive in its action as inertia of the mechanical parts is eliminated. The regulator also will not require mechanical adjustments for there are no air gaps, point openings or spring tensions to adjust.

Further, as there are no moving parts to shift, wear out and no springs to lose calibration by aging, no readjustment will be necessary to compensate for the same after an extended period of use.

Another advantage of the regulator, according to the present invention, is that the regulator will not be effected by temporary voltage surges or transients since the regulating circuit contains no iron. The only adjustment present in the regulator is an electrical adjustment which consists of a variable resistance. The adjustment of this resistance, will cause the voltage of the system to be raised or lowered within limits to any desired value.

When the regulator, according to the present invention, is used to control the field excitation of an alternator, an ultra-accurate control of the output voltage is achieved. By way of example, it has been noted that the field excitation of the alternator will be changed from a maximum to a minimum for less than one-half percent change in the system voltage or, in other words, for less than plus or minus one-fourth percent change in the system voltage between no load and full load. As the regulator controls the field for the alternator directly, the need for a separate exciter with its accompanying delay is eliminated.

It is an object, therefore, of the present invention to control the output potential of an electrical device by a regulator which includes a saturable reactor, at least one transistor and a silicon or Zener type diode.

A further object of the present invention is to control a saturable reactor by a transistor, the conduction of which is made responsive to the potential across a silicon or Zener type diode.

Another object of the present invention is to control the output voltage of an alternator by a regulator, which regulator is directly connected to the field of the alternator and includes a saturable reactor, a silicon diode and a transistor.

It is still another object of the present invention to provide a voltage regulator for an A.C. system with a silicon or Zener type diode and a transistor and to provide a bias on the diode and the base of the transistor so the transistor will be conductive over a selected portion of the Zener curve of the diode.

A further object of the present invention is to provide a regenerative circuit in a voltage regulator which has a circuit including at least one transistor, a silicon diode, and a saturable-reactor, to further increase the sensitivity of the regulator.

Another object of the present invention is to reduce the hunting tendencies of the regulator which are due to alternator delay in responding to the control of the regulator. This is accomplished by reducing momentarily the potential change in either direction across a silicon or Zener diode in response to a change in voltage in either direction in the alternator field.

Another object of the present invention is to momentarily change the conductivity of the silicon or Zener diode in a regulator of the character described in response to a momentary change in current through the field of an alternator so as to compensate for the delay presented by the alternator in responding to the control of the regulator.

A further object of the present invention is to momentarily change the conductivity of the silicon or Zener diode in a regulator of the character described in response to a momentary change in current in the control coil of a saturable reactor so as to compensate for the delay presented by the alternator in responding to the control of the regulator.

Further objects and advantages of the present invention will be apparent from the following description, reference being had to the accompanying drawings wherein preferred embodiments of the present invention are clearly shown.

In the drawings:

Figure 1 diagrammatically shows a wiring diagram of the voltage regulator circuit for an alternator according to the present invention.

Figure 2:
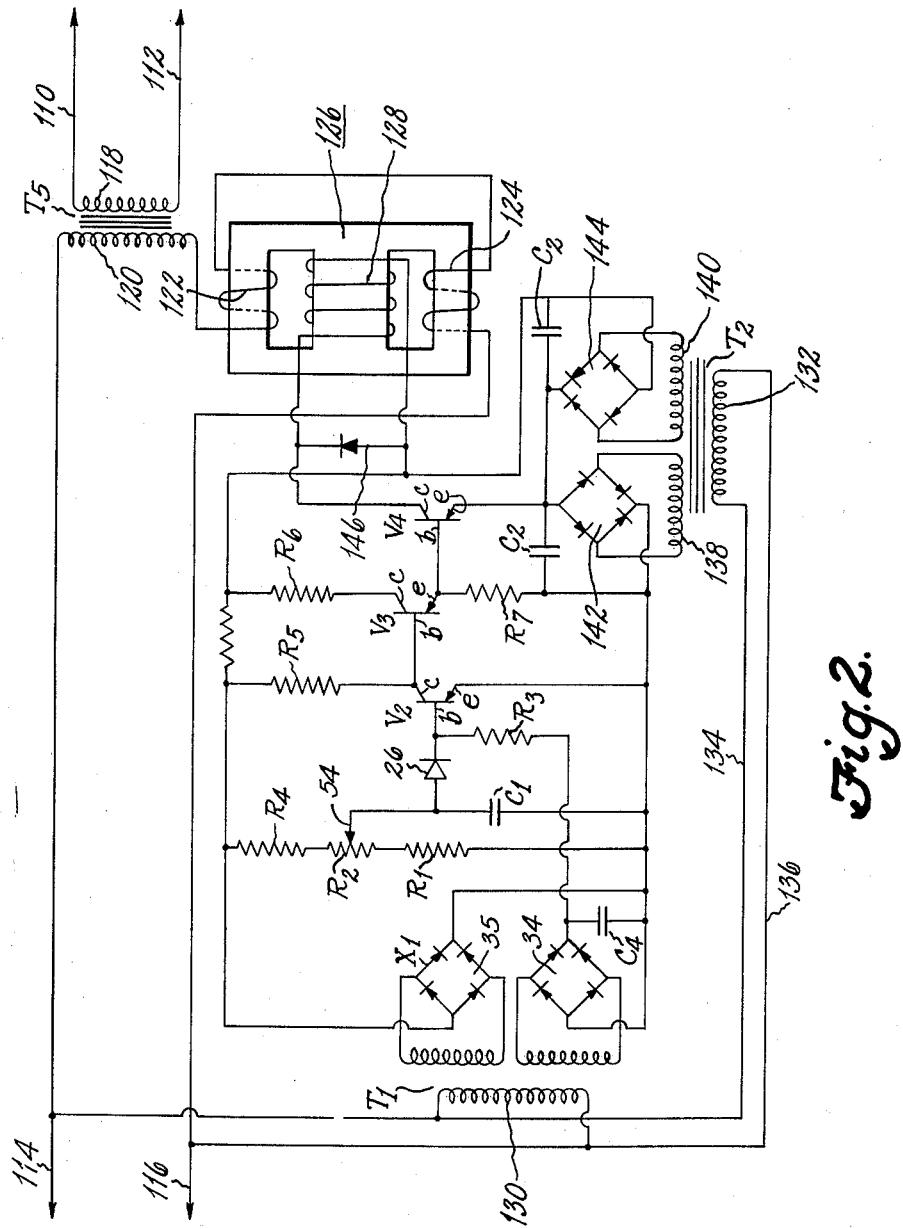

Figure 2 diagrammatically shows a line regulator circuit according to the present invention.

Figure 3:
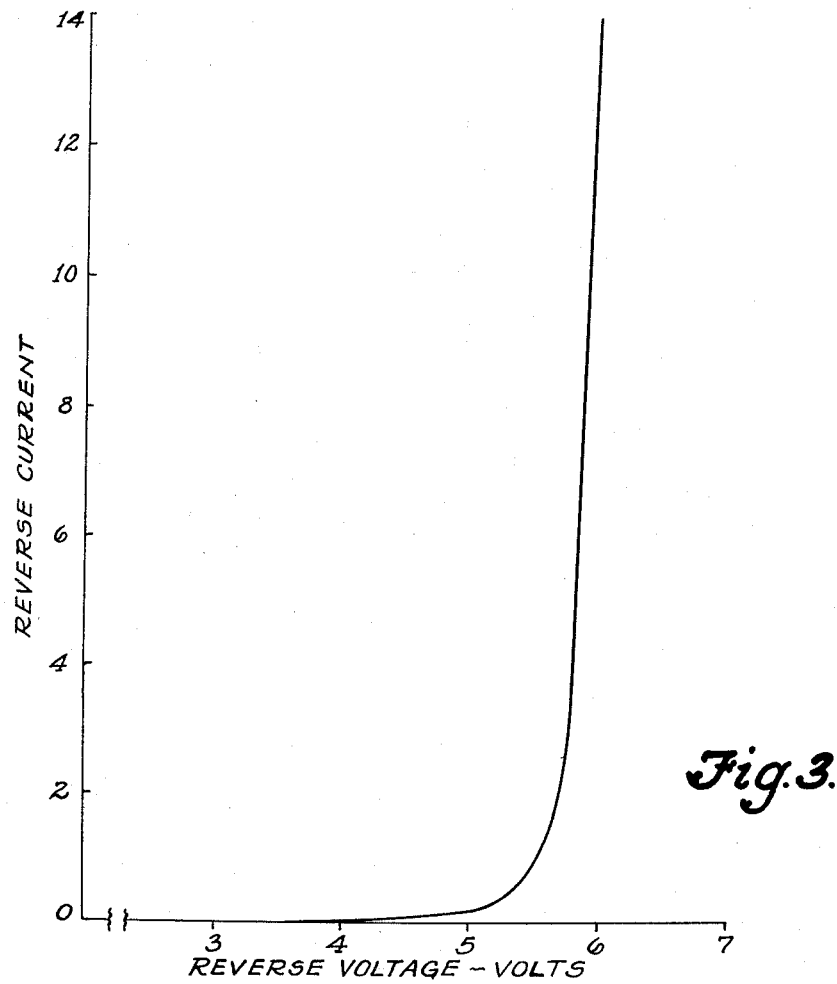

Figure 3 shows the voltage-current characteristic curve of the silicon or Zener diode as used in the regulator circuit of the present invention.

Figure 4:
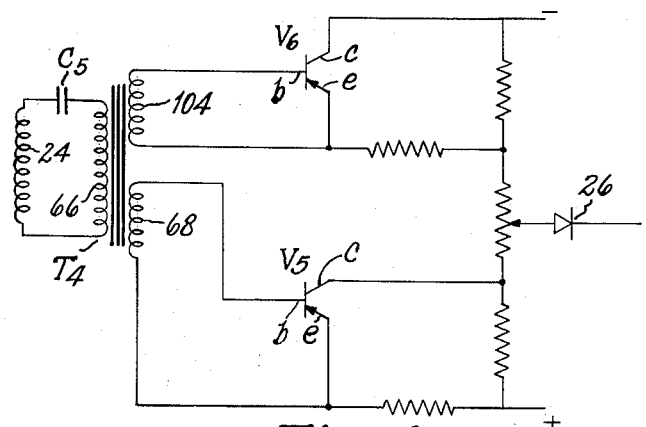

Figure 4 diagrammatically shows an anti-hunting circuit on a static-transistor regulator according to the present invention.

Figure 5:
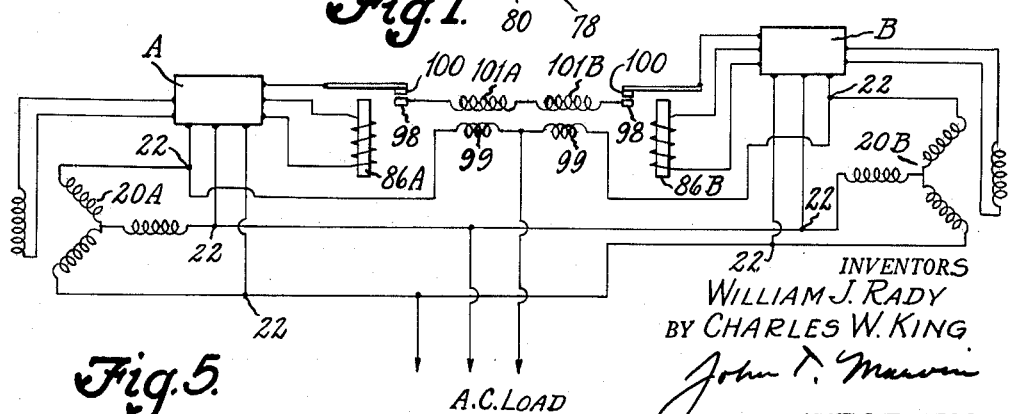

Figure 5 diagrammatically shows a circuit for paralleling two regulators and alternators as shown in Figure 1.

While the control circuit as shown in the drawings may be used as a line regulator or a voltage control for any suitably sized alternator, it is particularly suited for use as a static-type regulator to control the voltage output of high output constant frequency alternators such as may be used as a stand-by unit for a hospital.

The alternator 20 may be of any suitable single, or multiple phase, types having Y- or delta connected windings and is shown as having Y-connected output coils which are connected at terminals 22 to a suitable A.C. load, not shown. The field 24 of the alternator 20 is controlled by a static regulator circuit network which will be hereinafter described. The static regulator is responsive to changes in line voltage and will produce a large change in the energization of the field 24 in response to small changes in line voltage. This line voltage change is amplified in the regulator by a voltage sensitive diode, transistors and a saturable reactor. It has been determined that when the regulator according to the present invention is used, then a voltage shift of approximately 0.3 volt or less in a 120 line volt system is sufficient to change the energization of the field over its entire range.

Before describing the static regulator circuit network, a brief discussion of the characteristics of a transistor may be helpful in understanding the operation of the regulator. A transistor has three terminals commonly called the emitter, the base and the collector. If a well known PNP type transistor is used, current will flow from the emitter to the collector when the base is negative with respect to the emitter. Further, the more negative the base relative to the emitter, the more current will flow from the emitter to the collector. When the base is positive with respect to the emitter, the circuit between the collector and emitter acts as an open circuit; consequently, no current flow. In the drawings, each of the transistors will be designated by a numeral and the base thereof will be denoted by the letter "$b$," the emitter "$e$" and the collector "$c$."

The line or output voltage of the system is controlled by varying the excitation of field 24 of alternator 20. To accomplish this control, the silicon or Zener diode 26 in the circuit network acts as a voltage reference point in the circuit network. These diodes are well known and, in the circuit network shown, are connected to normally prevent current passage therethrough. It will be seen in Figure 3 that when the reverse voltage impressed across the diode exceeds a predetermined value, current will flow through the diode rectifier in the reverse direction. Further, when the reverse potential across the diode is reduced to a normal value or less, the diode will recover its rectifying or blocking action without damage. Another characteristic of the diode 26 is clearly shown in Figure 3. This characteristic is the large change in current which accompanies a relatively small change in voltage. Note the large current change which occurs between 5 and 6 volts. This feature is utilized to advantage in the circuit network of the present invention as will be hereinafter explained.

In Figure 1, the output terminals 22 of the alternator 20 are connected to line leads 28. The transformers $T_1$, $T_2$ and $T_3$ have their primary windings connected across leads 28 as shown. The transformer $T_1$ has a pair of secondary windings 30 and 32. The lead ends of winding 32 are connected to the input terminals of a rectifier 34. The transformer $T_2$ is shown as a three-phase unit with the secondary windings 36 connected to the input terminals of the full-wave three-phase rectifier 38. Transformers $T_1$, $T_2$ and $T_3$ may be single phase, two phase, or three phase or any combination thereof providing a suitable rectifier is used. $T_1$ may be single phase or three phase depending on whether single phase voltage sensing is desired or three phase which would give an average voltage. $T_3$ should be a three phase transformer using a three phase saturable reactor in the event the field power is more than can be taken from a single phase without causing too much phase unbalance.

The transformer $T_3$ is connected with a rectifier 48 to supply D.C. energizing current to field 24. This transformer $T_3$ has one end of its secondary winding 40 connected through the load coils 42 and 44 of the saturable reactor 46. Each of load coils 42 and 44 is connected to an input terminal of the open type bridge rectifier, as shown, so the current to the field will alternate between the load coils as the direction of current reverses in the winding 40. The other end of the transformer winding 40 is connected to the other input terminal of rectifier 48, as shown. The saturable reactor 46 and open type bridge rectifier 48 circuit used in Figure 1 is known as a single-phase bridge circuit. While only one saturable reactor circuit is shown, it is apparent other conventional saturable reactor hook-ups can be used if desired.

The resistances $R_1$, $R_2$, $R_3$, $R_4$, $R_5$, $R_6$ and $R_7$ and transistors $V_2$, $V_3$, and $V_4$ are connected in the circuit to the output terminals of rectifiers 38 and 35 as shown. The resistance $R_3$ has one of its ends connected between the diode 26 and transistor $V_2$ and has its other end connected to one of the output terminals of rectifier 34.

The emitter "$e$" and collector "$c$" of transistor $V_4$ are connected in circuit with the control coil 50 of the saturable reactor 46 and resistance 52 across the output terminals of rectifier 38.

The resistances $R_1$, $R_2$ and $R_4$ comprise a voltage divider which has an adjustable tap 54 which is connected to the sensing diode 26. The tap 54 is used to adjust the line voltage to the value desired. As the voltage potential between leads 56 and 59 increases, the potential between tap 54 and lead 56 will increase. It is to be noted that leads 56 and 59 are connected to the output terminals of rectifier 35 and the potential of these terminals is a direct function of the potential between the two leads 28 connected to the primary of $T_1$. Thus, as the potential between leads 28 increases, the potential between tap 54 and lead 56 will increase and tap 54 will be increasingly negative relative to lead 56.

As heretofore stated, the secondary coil winding 32 is connected to the input terminals of the rectifier 34. The positive output terminal of the rectifier 34 is connected through resistance $R_3$ to a junction intermediate the base "$b$" of transistor $V_2$ and the diode 26. The rectifier 34, when thus connected, acts as a bias and makes the base "$b$" of the transistor $V_2$ positive with respect to the emitter of transistor $V_2$.

In order to cause transistor $V_2$ to conduct, the base "$b$" must become negative with respect to the emitter "$e$"; consequently, the voltage drop must be sufficient to overcome the bias presented by rectifier 34. When the ohmic value of resistance $R_3$ is properly selected, the base of transistor $V_2$ will remain positive until the IR drop across resistance $R_3$ is sufficient to overcome the bias of rectifier 34. When this arrangement is used, the diode 26 can be made to operate in the sensitive Zener region which is the nearly vertical portion of the curve, see Figure 3. From this curve, it can be seen that a much higher current change in diode 26 is obtained when the diode 26 is operated above the knee portion of the curve. Thus, more gain is obtained and a small variation in potential between leads 56 and 59 will cause a large change of current flow in transistor $V_2$. It is to be noted Figure 3 shows a typical diode curve. It is clearly apparent that other diodes with different ratings can be used if desired, if the proper resistances are used therewith.

From the above, it is apparent that the base "$b$" of transistor $V_2$ will not be negative with respect to the emitter until the voltage drop across resistor $R_3$ exceeds the bias of rectifier 34. When the base of transistor $V_2$ becomes negative with respect to the emitter, current flow between the emitter and collector of $V_2$ will begin. This will cause a decreased current flow in the emitter to collector circuits of transistors $V_3$ and $V_4$, as will become hereinafter apparent so the current through the control coil 50 is decreased.

When the potential between leads 56 and 59 decreases, the current flow through diode 26 is reduced. This will reduce the current flow in $R_3$ and the base of $V_2$ will become more positive. As previously stated, when the base of $V_2$ becomes more positive less current will flow between the collector and emitter of $V_2$. This reduces the voltage drop across $R_5$ which, in turn, causes the base of transistor $V_3$ to become more negative and the emitter to collector conduction of $V_3$ to increase. This will increase the voltage drop across $R_7$ to cause the base of $V_4$ to become more negative relative to the emitter of $V_4$. The conduction between the emitter and collector of $V_4$ is then increased. The emitter and collector of $V_4$ are in series with control coil 50 of the saturable core reactor. Thus, when the flow of current between the emitter and collector of $V_4$ increases, the current in the coil 50 will be increased. When more current flows in coil 50, the iron in the saturable reactor becomes more nearly saturated with flux. With this condition, the impedance of the load coils is decreased and the current flow in the load coils is increased. This increased current is then rectified by rectifier 48 and passed through the field 24. The increased field current will then cause the alternator output voltage to increase and compensate for the system voltage decrease which originally reduced the conduction of the diode 26.

When the system voltage increases, then the above is reversed and less current passes through the control coil 50 of the saturable reactor 46. When this occurs, the reduced flux in the iron circuit of the reactor 46 allows more impedance to be developed by the load coils 42 and 44. This higher impedance reduces the field excitation which in turn causes the system voltage to decrease and compensate for the system voltage increase which initiated the action.

The reverse coil or bias 64 is carried on the same reactor leg of the saturable reactor core as is the control coil 50. This bias coil 64 has one end connected through the emitter side of transistor $V_4$ with one of the output terminals of rectifier 38. The other end of coil 64 is connected through the resistance 52 with the other output terminal of rectifier 38. The bias coil 64, when thus connected, has two functions in the circuit network. First of all, it will increase the impedance range of the reactor by causing the iron to be worked over a larger portion of its magnetization curve. This is accomplished by reversing the flux through load coil leg of the reactor during the half cycle of inoperation of the load coil. This occurs when maximum impedance is desired which is when transistor $V_4$ is not conducting and the control coil 50 is virtually de-energized. The bias coil 64 induces a flux in the iron of core 46 that is in the opposite direction to that of the flux induced by control coil 50—see arrows 51 and 65 which is the direction of the flux induced by coils 50 and 64, respectively. Secondly, the bias coil will eliminate the need for a positive bias on transistor $V_4$ to stop any leakage current which may occur in $V_4$. Any leakage current in $V_4$ will be more than compensated by the reverse coil 64.

As heretofore stated, transformer $T_1$ has a pair of secondary windings 30 and 32. The secondary winding 32, as previously discussed, is used in connection with the rectifier 34 to provide a bias for diode 26. The secondary winding 30 is connected to the input terminals of a rectifier $X_1$.

The rectifier $X_1$ and rectifier $X_3$ are arranged to provide two power sources and independent power circuits. Rectifier $X_1$ supplies the voltage and current to the sensing diode 26 which determines when the regulator should change the field current. Rectifier $X_3$ supplies the voltage and current required by transistors $V_3$ and $V_4$ and the control coil 50 and bias coil 64 of the reactor 46. The positive sides of the two power sources are tied together by lead 56 to provide a common reference level within the regulator. By connecting the negative side of these two power sources together through leads 58 and 59 and resistance $R_8$, regeneration is achieved. With the properly selected components and with the regulator operating in a steady-state condition such as when the voltage between leads 28 is low so transistor $V_4$ is near full conduction, the voltage between lines 58 and 56 will be slightly higher than the voltage between lines 59 and 56. A small percent of the load through $R_4$, $R_2$, $R_1$, $R_5$ will be supplied by rectifier 38. The remaining and largest portion of the load is supplied by rectifier 35. When the line voltage that is the voltage between leads 28 is increased, the voltage supplied by rectifier 35 is increased slightly and higher resulting voltage between lines 56 and 59 will cause diode 26 to conduct. This will cause the current flow through transistors $V_3$ and $V_4$ to be reduced so the current supplied by rectifier 38 is also reduced. Transformer $T_2$ is designed to have a voltage increase when its load is removed. The resulting higher voltage between lines 56 and 58 will cause rectifier 38 to supply a larger percent of the load supplied to $R_4$, $R_2$, $R_1$, $R_5$. This reduces the amount of current supplied by rectifier 35 and allows the voltage of the secondary 30 of transformer $T_1$ to increase since its load has been reduced. This increase in voltage is in addition to that caused by the increase in line voltage and, consequently, a smaller increase in the primary $T_1$ will cause a larger increase in the secondary of transformer $T_1$ than would be available if the regenerative resistor $R_8$ were removed. This regeneration further increases the sensitivity of the regulator.

In Figure 1, a feed-back circuit network is shown. This circuit is an anti-hunting circuit and is included to compensate for delays of response presented by the alternator. The feed-back circuit basically includes the transistor $V_5$ and feed-back transformer $T_4$ which are connected as shown in Figure 1. The feed-back transformer $T_4$ has its primary 66 winding connected in parallel with the field 24 and its secondary 68 is connected to the emitter and base of transistor $V_5$.

Included also in the primary winding 66 circuit is a resistance 70 to limit the amount of feedback and a D.C. blocking condenser $C_5$. Thus, the 120 cycle ripple on field 24 when used with a 60 cycle alternator will be reflected in the secondary winding 68. This A.C. voltage is applied between the base and emitter of transistor $V_5$, causing the transistor $V_5$ to conduct an the half cycle when the base is negative with respect to the emitter. The emitter to collector circuit of transistor $V_5$ is in parallel with resistance $R_1$, as clearly seen in Figure 1. Resistance 72 controls the amount of conduction of $V_5$. When $V_5$ conducts, because of its parallel arrangement with $R_1$, the resistance between junction 55 and lead 56 is effectively lowered, this in turn will lower the voltage across diode 26. The feed-back circuit when thus connected, has two functions. First of all, it will act as a source of regeneration since the A.C. ripple reflected from the field will be higher at a high field than at a low field current. This will cause transistor $V_5$ to conduct more, and effectively lower the voltage on diode 26, and finally allow the regulator to supply more field current without further drop in the system voltage. Secondly, the A.C. ripple reflected back to transistor $V_5$ will be modulated when a sudden change in system voltage occurs which tends to change the field suddenly. This modulation acts in a direction to slow the response of the regulator by momentarily influencing the voltage on diode 26 in such a direction to prevent hunting.

In Figure 1, it will be seen that the outlet taps 74 and 76 of the rectifier $X_3$ are connected to suitable leads 78 and 80, respectively. Leads 78 and 80 are connected to the actuating coils 82 and 84 of the paralleling relay 86 and field exciting relay 88, respectively. The function of the paralleling relay is to act as a switch and to connect the unit shown in Figure 1 in parallel with a unit, as in Figure 5, which is similar to the unit shown in Figure 1 only when the unit shown in Figure 1 is in operation. The paralleling relay 86 is designed so contacts 98 and 100 will not close until the voltage across terminals 74 and 76 reaches a predetermined level, i.e. alternator 20 is producing somewhere near its rated voltage. The paralleling circuit shown in Figure 5 will cause the regulator A in Figure 5 to compensate for a voltage difference between the regulator A and a similar voltage regulator B which is connected with the alternator 20B that is to be paralleled with alternator 20A. It is to be appreciated that the additional regulator B and alternator 20B are schematically shown in Figure 5. These units are identical with the units shown in Figure 1.

This will eliminate duplicate parts from the drawings. The coil 99 is connected in the A.C. load circuit. That is between one of the output terminals 22 of the alternator 20A and 20B. The coils 99 induce a voltage and current in coils 101 when the contacts 98 and 100 of both relays 86A and 86B are closed. It is clear that when the regulators are thus connected in parallel, the units will produce voltages in opposition to each other. The regulator with the higher load because of the relative output and connection of the rectifiers 35 in the two regulators will produce the higher voltage and dictate the direction of current in the paralleling circuit. If the regulator A is operating at a lower voltage than the regulator B, the resulting current as induced in coil 101A which passes through resistance 102 as shown in Figure 1, will be in a direction to oppose the output voltage of coil 30. This will cause the conduction of diode 26 in regulator A to be lowered and will result as has heretofore been discussed, in raising the output voltage of alternator 20A. At the same time, the alternator 20B which is paralleled with the alternator 20A which is shown in Figure 1 will have its output voltage decreased so the two alternators 20A and 20B will operate in parallel and supply approximately equal percentages of the load. If the alternator 20A were operating at a higher voltage than the alternator 20B, then the current through resistance 102 in Figure 1 would be in such a direction to cause the conduction of diode 26 to be higher and this would result in lowering the output voltage of alternator 20A and a lower system voltage.

Suitably connected across the field 24 are leads 90 and 92. These leads 90 and 92 are connected through a suitable on-off switch and a pair of normally closed contacts 94 and 96 with a suitable source of D.C. current, not shown, as a storage battery.

This arrangement will permit the field 24 to be excited from an external D.C. current source until the alternator 20 is developing a sufficient output so transformer $X_5$ can supply the necessary current to render the system self-exciting. When the alternator output reaches a sufficient value, the coil 84 will cause the contacts 94 and 96 of relay 88 to open and break the circuit between the field 24 and external D.C. current and voltage source.

In Figure 4 of the drawings, an optional feed-back circuit incorporating two transistors $V_5$ and $V_6$ instead of the single transistor $V_5$ as described in Figure 1 is shown. When two transistors $V_5$ and $V_6$ are used each transistor is responsive only to a change in field current since all steady-state ripple is filtered out by suitable filters, not shown, in the circuit including field 24 and blocking condenser $C_5$. When the voltage across the field begins to decrease, a voltage will be induced in coil 68 by the coil 66 which is in shunt circuit with the field. The polarity of coil 68 will be in a direction to cause the base of transistor $V_5$ in Figure 4 to become negative with respect to the emitter. Transistor $V_5$ will then conduct and lower the voltage across the diode 26 and reduce its conduction. This action will be transmitted through the regulator and slow down the voltage change in the field 24. The transistor $V_6$ will not be conductive at this time since its base is made positive with respect to the emitter when the voltage across the field decreases. The coils 68 and 104 of the transformer $T_4$ are wound so this result will be accomplished. When the voltage across the field increases, the transistor $V_6$ will conduct causing the voltage across the diode 26 to increase and increase its conduction. This action will be transmitted through the regulator and slow down the voltage change in the field 24. The action of the feed-back transistors as shown in Figure 4, will effectively reduce any hunting tendencies due to alternator delay. When a steady state of regulation is reached, no voltages are impressed on either transistor $V_5$ or $V_6$ in Figure 4 and the conduction of the diode 26 is not influenced when feedback is not required.

It is to be noted in Figure 1, that the transformer $T_4$ of the feed-back current is connected across the field 24. If desired, the primary winding 66 of the transformer $T_4$ may be connected across the terminals of the control coil 50 and resistance 52 and when it is so connected it will respond to the changes of voltage in the control coil in the same manner as when it is connected across the field and will minimize the hunting tendencies of the alternator.

In Figure 2 of the drawings, a line regulator is shown. This regulator, when connected to a suitable source of A.C. current and voltage indicated by input leads 110 and 112, will supply practically a constant A.C. voltage to output leads 114 and 116 within the limits heretofore set forth. Most of the parts of the regulator in Figure 2 are the same as were described in the embodiment in Figure 1.

In the regulator in Figure 2, the leads 110 and 112 are connected to the primary winding 118 of a line transformer $T_5$. One of the output leads 114 is directly connected to one end of the secondary winding coil 120 of transformer $T_5$. The other lead 116 is connected through the load coils 122 and 124 of the saturable core reactor 126 to the other end of coil 120.

The control coil 128 of the saturable reactor 126 is connected to the regulator circuits which will be hereinafter discussed. This coil 128 has the same function as coil 50 in Figure 1 and is used to vary the saturation level of the iron core of the saturable reactor. Thus, as the current flow in the coil 128 is increased the saturation of the iron of core 126 will be increased and offer less impedance to the current flow in the load coils so the voltage between the leads 114 and 116 increases. When the current in coil 128 is decreased, likewise, the voltage across leads 114 and 116 is decreased.

The primary coil windings 130 and 132 of tranformers $T_1$ and $T_2$, respectively, are connected to leads 114 and 116 by leads 134 and 136 so the voltage in the secondary coil windings of transformers $T_1$ and $T_2$ will vary directly with the voltage fluctuations in leads 114 and 116. The remaining parts of the regulator which bear similar numerals to the corresponding parts in Figure 1 have all been heretofore described. In the embodiment shown in Figure 1, the transformer $T_2$ is shown as a three-phase transformer with a three-phase secondary winding 36. This transformer may be used in the embodiment in Figure 2 wherein a three-phase output circuit is provided. The transformer $T_2$ in Figure 2, however, has a single primary winding and a pair of secondary coil windings 138 and 140. The ends of these coils 138 and 140 are connected to a pair of suitable rectifiers 142 and 144 as shown. The output leads of the rectifiers are then connected to provide the proper positive and negative poles as shown.

The transformer coil 140 and rectifier 144 is a single power source comparable to the three-phase power source, transformer $T_2$ and rectifier $X_3$, used in Figure 1. The second transformer coil 138 and rectifier 142 serves as a bias. This bias will cause the base of transistor $V_4$ to become positive with respect to the emitter of $V_4$ when there is little or no current through resistance $R_7$. This bias will eliminate any leakage in transistor $V_4$ that does occur when the base and emitter are at the same potential. Transistor $V_4$ will conduct in a normal manner when the base becomes negative with respect to the emitter. As the current through $R_7$ is increased, the bias voltage is overcome and the base of transistor $V_4$ becomes negative with respect to the emitter.

This arrangement of using a transformer and rectifier on transistor $V_4$ of the line regulator may be used instead of the reverse coil 64 in the circuit shown in Figure 1 and, further, it may be used in addition to and in conjunction with the reverse coil 64, if desired.

The condensers $C_1$, $C_2$ and $C_4$ are connected as shown and are included to remove ripples in the direct current and other transients so the regulator will respond to the average values of the D.C. voltage.

Rectifier 146 in Figure 2 acts as a by-passing circuit to allow the induced voltage resulting from any sudden change of control coil current to dissipate itself. This acts as a protective device for transistor $V_4$ when an induced voltage is present.

Resistance 102 in Figure 1 provides the drop necessary in the paralleling circuit as has been previously explained.

While the embodiments of the present invention as herein disclosed constitute preferred forms, it is to be understood that other forms might be adopted.

What is claimed is as follows:

1. A regulator for controlling the output voltage at the output terminals of an alternator having an exciting field winding, comprising in combination; a transformer having a primary winding connected with said output terminals and having a secondary winding, a saturable iron core reactor having a load coil connected in series circuit with said secondary winding, a rectifier connected between said load coil and said field, a control coil for said reactor for varying the saturation of the iron of said core and the impedance of said load coil to vary current flow from said rectifier to said field, and means for controlling current flow in said control coil comprising; a voltage sensitive diode, means connecting said diode with said terminals for varying the voltage across said diode directly with variations in voltage at said terminals, and means including at least one transistor connected with said diode, and control coil for increasing and decreasing current flow in said control coil inversely with the voltage across said diode.

2. A line regulator comprising; a line transformer having output terminals connected to provide an output circuit with a variable voltage A.C. current, a saturable iron core reactor having a load coil in said circuit, means for varying the saturation of the iron of said core and the impedance of said load coil for maintaining the voltage in said circuit substantially constant including; a voltage responsive diode, means connected to said circuit for varying the voltage across said diode directly with the voltage of said circuit, a control coil for said saturable core reactor, and means connected to said diode and control coil for varying current flow in said coil indirectly with the variations of voltage in said circuit.

3. A line regulator comprising; a line transformer having output terminals connected to provide an A.C. output circuit; a saturable iron core reactor having a load coil in said circuit, a means for varying the impedance of said coil and maintaining the voltage in said circuit substantially constant including; a voltage responsive diode, means connected to said circuit for varying the voltage across said diode directly with the voltage of said circuit, a control coil for said saturable core reactor, and a means including a transistor network connected to said diode and control coil for varying current flow in said coil indirectly with the variations of voltage in said circuit.

4. In a voltage regulator circuit network, the combination comprising; a saturable iron core reactor having a load coil connected in circuit with a field of a generator and a control coil for varying the saturation of said iron core and the impedance of said load coil whereby the excitation of said field is varied, a transistor network connected with said control coil having a variable conductivity for varying current flow in said control coil, a voltage sensitive diode means connected to said transistor network for controlling the conductivity of said transistor network, and a bias means connected to said diode means and transistor network for rendering said network insensitive to the voltage across said diode means until the current through the diode means exceeds a predetermined value.

5. In a voltage regulator circuit network for an alternator having an exciting field and output terminals, the combination comprising; a saturable iron core reactor having a control coil, a transistor network connected with said control coil having a variable conductivity for varying current flow in said control coil, a voltage sensitive diode means connected to said transistor network for controlling the conductivity of said transistor network, a bias means connected to said diode means and transistor network for rendering said network insensitive to the voltage across said diode means until the current through the diode means exceeds a predetermined value, and a means connected with said output terminals, said transistor network and diode means for rendering the voltage sensitive diode means more sensitive to current changes at said output terminals.

6. In a voltage regulator network for an alternator having an exciting field and output load terminals, the combination comprising; a saturable iron core reactor having; a load coil connected in circuit with said field and a control coil for varying the saturation of said iron, the impedance of said load coil and the flow of current in said field, a transistor network connected with said control coil having a variable conductivity for varying current flow in said control coil, a voltage sensitive diode means connected to be responsive to voltage of the terminals and connected with said transistor network for controlling the conductivity thereof in response to voltage changes at said terminals, and a means including a transistor connected with said diode means and said field for rendering the diode sensitive to sudden current changes in said field.

7. In a voltage regulator network for an alternator having an exciting field and output load terminals, the combination comprising; a saturable iron core reactor having; a load coil connected in circuit with said field and a control coil for varying the saturation of said iron, the impedance of said load coil and the flow of current in said field, a transistor network connected with said control coil having a variable conductivity for varying current flow in said control coil, a voltage sensitive diode means connected to be responsive to voltage of the terminals and connected with said transistor network for controlling the conductivity thereof in response to voltage changes at said terminals, and a means including a transistor and transformer connected with said diode means and across said control coil for rendering the diode sensitive to sudden current changes in said control coil.

8. In a voltage regulator circuit network, the combination comprising; a saturable iron core reactor having a control coil, a transistor network connected with said control coil and having a variable conductivity for varying current flow in said coil, a voltage sensitive means including a voltage sensitive diode connected to said transistor network for controlling the conductivity of said network, a bias means connected to said voltage sensitive means and transistor network for rendering said network insensitive to the voltage across said diode until the current through the diode exceeds a predetermined value, and a means including a transformer connected to be responsive to current fluctuations in said control coil and a transistor connected with said transformer and voltage sensitive means for rendering the voltage sensitive means sensitive to sudden changes in current flow in said coil.

9. In a voltage regulator circuit network, the combination comprising; a saturable iron core reactor having a control coil and a load coil responsive to current flow in said control coil and connected for energizing a field of an alternator, a transistor network connected with said control coil and having a variable conductivity for varying current flow in said control coil, a voltage sensitive means including a voltage sensitive diode connected to said transistor network for controlling the conductivity of said network, a bias means connected to said voltage sensitive means and transistor network for rendering said network insensitive to the voltage across said diode until the current through the diode exceeds a predetermined value, and a means including a transformer connected to be responsive to current fluctuations in said field and a transistor connected with said transformer and voltage sensitive means for rendering the voltage sensitive means insensitive to sudden changes in output voltage of said alternator.

10. In a voltage regulator circuit network, the combination comprising; a saturable iron core reactor having a control coil and a load coil responsive to current changes in said control coil and connected for energizing a field of an alternator, a transistor network connected with said control coil and having a variable conductivity for varying current flow in said control coil, a voltage sensitive means including a voltage sensitive diode connected to said transistor network for controlling the conductivity of said network, a bias means connected to said voltage sensitive means and transistor network for rendering said network insensitive to the voltage across said diode until the current through the diode exceeds a predetermined value, a means including a pair of power sources connected to said voltage responsive means and to said transistor network and interconnected to provide a regenerative circuit for said voltage responsive means, and a means including a transformer connected across said field and a transistor connected in circuit with said transformer and voltage sensitive means for rendering the voltage sensitive means insensitive to sudden changes in output voltage of said alternator.

11. In a voltage regulator circuit network, the combination comprising; a saturable iron core reactor having a control coil and a load coil responsive to current changes in said control coil, a transistor network connected with said control coil and having a variable conductivity for varying current flow in said control coil, a voltage sensitive means including a voltage sensitive diode connected to said transistor network for controlling the conductivity of said network, a bias means connected to said voltage sensitive means and transistor network for rendering said network insensitive to the voltage across said diode until the current through the diode exceeds a predetermined value, a means including a pair of power sources connected to supply current to said voltage responsive means and to said transistor network and interconnected to provide a regenerative circuit for said voltage responsive means and transistor network, and a means including a transformer connected across said control coil and a transistor connected in circuit with said transformer and voltage sensitive means for rendering the voltage sensitive means sensitive to sudden changes in current in said control coil.

12. The combination as set forth in claim 8 wherein the saturable iron core reactor has a reverse coil connected in circuit with the transistor network to increase the working range of saturation of the iron of the core and to compensate for current leakage in the transistor network.

13. In an alternating current generating system; the combination comprising; a pair of alternators, each having output terminals connected in circuit with the output terminals of the other for parallel circuit operation, means including a transistor for regulating the individual output voltage of each of said alternators, and means connected to the output terminals of both alternators for controlling said other means so the outputs of both alternators are equal.

14. The combination as set forth in claim 13 wherein the means connected to the terminals of both alternators includes a relay for interconnecting the means for regulating one of the alternators with the means for regulating the other alternator when the first alternator is producing substantially a predetermined voltage.

15. A feed-back circuit network for rendering a voltage regulator insensitive to sudden changes in output voltages of an alternator comprising; a transformer having a primary and secondary coil windings with the primary winding connected in shunt with the field of the alternator, and a transistor having a base, an emitter, and a collector with the base and emitter connected across the secondary winding so the transistor is rendered conductive when the voltage changes in the direct current circuit.

16. A feed-back circuit network for rendering a voltage regulator insensitive to sudden changes in output voltages of an alternating current unit having a direct current control winding comprising; a transformer having primary and secondary coil windings with the primary winding connected in shunt with the direct current winding, and a transistor having a base, an emitter, and a collector with the base and emitter connected across the secondary winding so the transistor is rendered conductive when the voltage changes in the direct current circuit.

17. In a voltage regulator circuit, the combination comprising; a saturable iron core reactor having a control coil, means including transistor means for controlling current flow through said coil, means including a diode for controlling the conduction of said transistor means and a pair of direct current power sources connected for respectively supplying current to each of said means, said power sources being constructed and interconnected so a decrease in current output of one will result in increase in output voltage of the other to increase the sensitivity of the regulator.

18. A voltage regulator circuit network for an alternating current generator having an exciting field winding and output terminals, comprising; means including a transformer and rectifier connected to said terminals, and means including a voltage sensitive diode, a transistor, and a saturable iron core reactor connected in circuit with said first means and field for varying the excitation of said field inversely with variations in voltage at said terminals, said transistor having base and emitter electrodes connected in a circuit with said first means through said diode, and means for applying a bias to said circuit to make the base of the transistor positive with respect to the emitter until the current through said diode exceeds a predetermined value.

References Cited in the file of this patent

UNITED STATES PATENTS

| 2,472,538 | Krauer et al. | June 7, 1949 |
| 2,675,515 | Blashfield | Apr. 13, 1954 |
| 2,740,086 | Evans et al. | Mar. 27, 1956 |
| 2,751,545 | Chase | June 19, 1956 |
| 2,759,142 | Hamilton | Aug. 14, 1956 |